United States Patent [19]

Parker

[11] 4,306,192
[45] Dec. 15, 1981

[54] BACKGROUND SUBTRACTOR

[75] Inventor: Stephen D. Parker, Erlanger, Ky.

[73] Assignee: Fleit & Jacobson, Washington, D.C.

[21] Appl. No.: 943,634

[22] Filed: Sep. 19, 1978

[51] Int. Cl.³ .......................... H03B 1/00; G01T 1/00
[52] U.S. Cl. .................................. 328/139; 328/165;
328/169; 250/328
[58] Field of Search ................ 328/72, 109, 139, 165;
250/328

[56] References Cited
U.S. PATENT DOCUMENTS

| | | | |
|---|---|---|---|
| 3,484,704 | 12/1969 | Hungerford | 328/139 |
| 3,925,613 | 1/1975 | Kokado | 328/139 |
| 4,001,584 | 1/1977 | Mueller et al. | 250/328 |
| 4,044,311 | 8/1977 | Kashioka et al. | 328/139 |

Primary Examiner—Stanley D. Miller, Jr.
Assistant Examiner—B. P. Davis
Attorney, Agent, or Firm—Fleit & Jacobson

[57] ABSTRACT

A background subtractor circuit is disclosed for subtracting a preselected number of pulses from a train of input pulses. Switches are provided whereby the operator selects the background pulse rate, attributed to environmental factors, and wherein a train of background pulses are subtracted, at a preselected rate, from the incoming pulse train.

19 Claims, 6 Drawing Figures

BACKGROUND SUBTRACTOR

BACKGROUND AND SUMMARY OF THE INVENTION

The invention relates to a background subtractor circuit for use as part of an overall system to measure radioactivity in a test tube sampling apparatus or the like. It is known in the art to sample various human or animal fluids, including blood, and to analyze such fluids by placing the fluids in a test tube and associating the same with radioactive material. By known techniques, information regarding such bodily fluids can be developed by measuring the gamma ray emission from the material in the test tube.

Detectors or sensors that pick up, or sense, the gamma ray emissions from such test tubes are well known in the art, and the most advanced are typically automatic which operate on a plurality of test tubes in a given procedure. For a more detailed discussion of the procedure noted above, and for a full disclosure of an automatic sample changer, see U.S. Pat. No. 4,001,584, issued to the present assignee on Jan. 4, 1977.

In the known systems, the gamma rays detected are converted to voltage pulses or spikes, and are then fed to a pulse height analyzer circuit. The pulse height analyzer circuit filters out unwanted pulses by passing pulses that are only within a certain minimum and maximum height. Although the pulse height analyzer filters out many of the unwanted pulses, it has been found, in practice, that not all of the unwanted pulses are removed. Frequently, a number of unwanted so-called background pulses still exist, largely caused by background or environmental noise. It is important for the operator of the system to be aware of the unwanted pulses that are caused by the background or environmental noise, for, otherwise, inaccuracies in readings are likely to result.

It is an object of the present invention to provide an apparatus whereby an operator can manually select, by means of thumbwheel switches or other conventional switches known in the art, the number of pulses that are caused by noise or environmental factors, and by thus setting the switch to the number of pulses of background noise per minute, the pulses are automatically subtracted from the incoming pulse rate from the pulse height analyzer, thus providing an output reading that is devoid of background pulses.

In order for the operator to determine the amount of background pulses to be removed, the apparatus is set up in the particular environment where it is to be used and the operator takes a reading for a given period of time, one minute for example, without measuring any radioactivity from the test tube. The number of pulses obtained in one minute represent the background noise caused by environmental factors, such as naturally occurring gamma ray emitting Isotopes, photomultiplier noise and cosmic rays. A reading is obtained for a sufficient length of time and the operator then calculates the amount of background noise, or pulses, per minute. This reading of background noise pulses per minute is then set by the operator into a background subtractor circuit that constitutes the present invention. In operation, the background pulses are automatically subtracted from the incoming pulse rate from the pulse height analyzer.

Generally, the pulse output from the pulse height analyzer, representing the gamma ray emissions plus background noise, are analyzed in two distinct modes. One mode, called the preset time mode, takes a reading for a preset period of time and counts the number of pulses in that time frame. The other mode, called the preset count mode, measures the amount of time that it takes to receive a fixed number of pulses. Generally, when measuring radioactivity that has a fairly low count rate, it is desirable to use the preset time mode wherein the number of pulses in a given period of time are measured. This is largely for reasons of economy since if the count rate is very low, it would take a substantial amount of time to receive a given number of pulses. It is thus a further object of this invention to provide a background subtractor that is capable of being used in either the preset time or preset count mode.

When using the system for rather low count rates in the preset time mode, at the end of the measured time interval only a small number of detected pulses may be sensed. In such a case, it is necessary that all background pulses in that time interval be subtracted to provide an accurate reading. Thus, it is an object of the background subtractor of the present invention to include a means whereby the initial pulses of the incoming pulse train are delayed by means of a shift register, and later cleared at the end of the preset time interval in order to assure that all background noise pulses are removed.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 1:
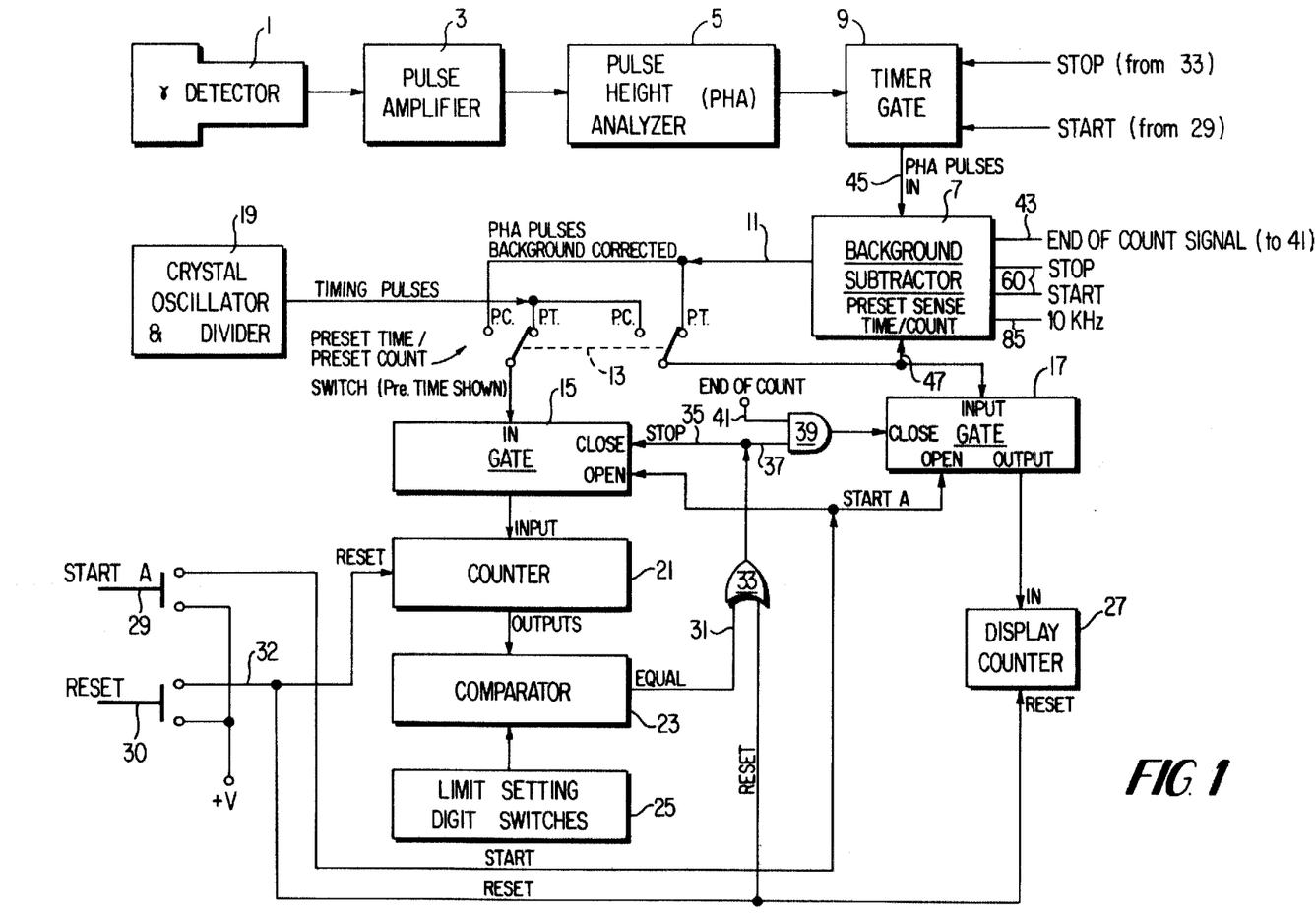
FIG. 1 is a block diagram showing the overall system operation for measuring the gamma rays emitted from a test tube in a test tube sampling apparatus.

The overall detection system for measuring radioactive emissions, particularly adapted for use in measuring gamma ray emissions from a test tube in a blood sampling apparatus, is depicted in FIG. 1. It should be noted that the overall circuit depicted in FIG. 1, with the exception of the inclusion of the background subtractor 7, is old in the art. It is the novel background subtractor, alone and in combination with the remaining circuitry, which comprises the invention. The gamma ray detector 1 is a conventional known sensor for detecting radioactive emissions and converting the emissions into voltage pulses or spikes which are then applied to a conventional pulse amplifier 3 and to a pulse height analyzer (PHA) 5. The pulse height analyzer is likewise a conventional apparatus that filters out unwanted pulses by passing those pulses that are within a certain minimum and maximum height. The pulses from the pulse height analyzer are applied to a background subtractor 7 through a timer gate 9. The timer gate is controlled by stop and start signals, which signals are dependent upon a predetermined time interval or a predetermined count interval which will be discussed more fully below.

One type of gamma ray detector that can be used is a NaI(TI) crystal optically coupled to a photomultiplier tube. The pulse height analyzer that can be used is the dual level dual comparator type.

The background subtractor 7 removes a predetermined number of pulses dependent upon the background or environmental noise that is to be subtracted from the gated incoming pulses from the pulse height analyzer 5. The output 11 of the background subtractor 7 is provided to a double pole switch arrangement 13 which is manually selected by the operator into a preset time condition, P.T., or a preset count position, P.C. When the switch 13 is in the preset count mode, i.e., when the contacts of switch 13 associate with the terminals P.C., the output line 11 of the background subtractor is provided to a gate 15. In the preset time mode, on the other hand, when the contacts of switch 13 associate with the terminals P.T., the output line 11 of the background subtractor is connected to a gate 17. The gates 15 and 17 are conventional.

A crystal oscillator and divider circuit 19 provides timing pulses to the system. Circuit 19 is a conventional clock circuit that repetitively clocks out a certain number of pulses per minute. When the switch 13 is in the preset count mode, the timing pulses from the crystal oscillator 19 are applied to the gate 17. When the switch 13 is in the preset time mode, the oscillator 19 provides pulses to the gate 15.

The input pulses to the gate 15, whether provided from the crystal oscillator 19 in the preset time mode or provided from the background subtractor 7 in the preset count mode, are fed to the input of a counter 21 and subsequently to a comparator 23. The counted pulses from counter 21 are compared with a predetermined number set by the operator by use of limit setting digit switches 25. In the preset time mode, the operator sets the amount of time within which the measurement is to be made, whereas, in the preset count mode, the operator sets the predetermined number of counts that he desires the system to make. The counter 21, comparator 23, and digit switches 25 are all conventional devices. For example, the counter 21 can be a series of TTL 7490's; the comparator 23 can be a series of TTL 9324's; and the limit setting digit switches 25 can be a series of encoded thumbwheel switches.

Referring to the gate 17, the pulses provided at the input of this gate, whether from the crystal oscillator 19 in the preset count mode, or from the background subtractor 7 in the preset time mode, are applied to a display counter 27. The display counter 27 is any conventional display counter that is capable of converting input pulses to a readout for communication with the operator. One such display counter 27 is a series of suitably decoded BCD counters.

The operation of the overall system of FIG. 1 will now be described. After providing the gamma ray detector 1 with a suitable source, such as a test tube containing radioactive material, the operator determines whether he wishes to measure the number of pulses in a given period of time, i.e., the preset time mode, or the amount of time it takes to sense a predetermined number of pulses, i.e., the preset count mode. Let us first consider the preset count mode. In such a case, the operator will set the switch 13 in the preset count position, wherein the double contacts of switch 13 associate with the terminals P.C. The operator then determines the number of pulses that he desires to measure, and this number is manually set by manually using the limit setting digit switches 25.

A start button 29 is then actuated to provide a voltage source to the gates 15 and 17 which opens both gates, enabling input signals to pass therethrough. Likewise, the start signal is provided to the timer gate 9 which permits pulses from the pulse height analyzer 5 to pass into the background subtractor 7. The background subtractor 7 receives the pulses from the pulse height analyzer and subtracts a certain number of pulses reflecting the background noise, in a manner to be described below. The output 11 of the background subtractor 7 is provided to the gate 15, then to the counter 21, and then to the comparator 23 which counts the number of pulses from the background subtractor 7 until the predetermined number is reached as set by the digit switches 25. During this same time, time pulses from the crystal oscillator 19 are provided to the gate 17, and the number of the pulses is displayed by the display counter 27. At the end of the preset count, i.e., when the number of pulses fed from counter 21 to comparator 23 equals the preset number preset into the digit switches 25, the comparator issues an equal signal which is fed to an input terminal 31 of an OR gate 33. The output of the OR gate 33 is transmitted over line 35 to provide a stop signal for the gate 15. This stop signal closes gate 15, thus discontinuing the count of further pulses from the background subtractor. The stop signal from OR gate 33 is also provided to timer gate 9 to block the passage of further input pulses from the pulse height analyzer 5 to the background subtractor 7.

The output of the OR gate 33 is also provided to an input terminal 37 of an AND gate 39. The other terminal 41 of the AND gate 39 is connected to a terminal 43 of the background subtractor 7 which provides an end of count signal, to be discussed below. Thus, when the background subtractor 7 indicates that its counting cycle is complete, by reason of an output signal on the line 43, the output of the OR gate 33 passes through the AND gate 39 and closes the gate 17, thus blocking the passage of further timing pulses from the crystal oscillator 19 through the gate 17 for display on the display counter 27. The display counter 27 therefore indicates the amount of time in which the predetermined number of pulses were obtained.

Referring now to the preset time mode, the operator sets the switch 13 to contact the terminals P.T. The limit setting digit switches 25 are then set to the particular time interval in which the operator desires to measure a number of pulses. The start button 29 is then actuated thus opening gates 15 and 17 as in the preset count mode. Likewise, the timer gate 9 is actuated to enable pulses from the pulse height analyzer to be provided to the background subtractor 7. In the preset time mode, the output pulses of the background subtractor 7 are provided to the input of the gate 17 wherein the number of the pulses received are passed to the display counter 27 for counting and display. During this time, timing pulses from the crystal oscillator 19 are provided to the gate 15, counted in the counter 21, and compared with the preset time interval in the comparator 23. When the preset time interval is reached, the output of the comparator 31 is provided to OR gate 33 and likewise stops the gates 15 and 17, and timer gate 9 in the same manner as discussed above. Thus, in the preset time mode, the display counter 27 counts and displays the number of pulses detected in a given time interval.

A reset switch 30 is shown to provide a voltage signal over line 32 that closes the gates 15 and 17 and clears the counters 21 and 27. This insures a zero initial starting point for the system.

The background subtractor circuit 7 depicted in FIG. 2 will now be described. The gates input pulses from the pulse height analyzer 5 via the timer gate 9, are provided to the background subtractor via the input line 45. A preset time/count signal is provided to the background subtractor through the line 47. The signal over the line 47 is different depending upon whether the preset time or preset count mode is selected by the operator. As shown in FIG. 1, when the preset count mode is selected, the signal over line 47 represents the timing pulses from the crystal oscillator 19. When the preset time mode is selected, the signal over line 47 represents the output of the background subtractor over line 11. It should be recognized that the output timing pulses of the crystal oscillator 19 represent pulses having a high duty factor, or cycle, whereas the output pulses of the background subtractor over line 11 have a low duty factor, or cycle. Moreover, when the system is initially started by the operator, the output of the background subtractor 11 will be zero for a predetermined number of pulses, as will be described below. Thus, the input over line 47 receives a high duty factor signal in the preset count mode (which signal can be logically represented as the "1" state), and a low duty factor signal in the preset time mode (which can logically be represented as the "0" state).

In the preset count mode, a high duty factor, or "1", signal is applied through the line 47. This signal is applied to an input terminal 49 of OR gate 51 and the output of OR gate 51 is applied to an input terminal 53 of AND gate 55. The pulse height analyzer gates input pulses over line 45 are provided to an input terminal 57 of OR gate 59 and the output of OR gate 59 is applied to input terminal 61 of the AND gate 55. The output of the AND gate 55 is provided to an input terminal of an AND gate 58 that has, as its output, the output terminal 11 of the background subtractor.

A stop/start signal is applied to the background subtractor via line 60. This stop and start signal corresponds to that previously discussed with reference to FIG. 1. That is, the start signal is the signal produced by the voltage source when the operator actuates the start button 29. The stop signal represents the output signal 35 of the OR gate 33. The stop/start signal is applied via line 60 to the input 61 of an 8-bit clock circuit 63. This clock, which is conventionally designed to clock out 8-bits of pulses when actuated, is normally uninhibited. That is, when the input at line 65 is in its low or "0" state, i.e., in the preset time mode, the clock is uninhibited. When in its high state, i.e., the present count mode, it is inhibited and not susceptible to being triggered. The output of the clock 63 is provided to NOR gate 66 which provides the end of count signal 43. The NOR gate 66 has the characteristic whereby when both inputs are in their low or "0" state, the output is in its high or "1" state. Thus, in the preset count mode, when the circuit is started, a high or "1" signal is provided over line 60 and over lead 67 to the input of the NOR gate 66. This prevents an output signal at 43 at least until the stop signal is received at 60. When a stop signal is received at 60, thus providing a "0" at input 67 of the NOR gate 66, the output of NOR gate 66 at 43 will be in its high or "1" state since the input line 69 of the NOR gate 66 is likewise zero. The line 69 will always be zero in the preset count mode since the 8-bit clock 63 is always inhibited in such a mode. Thus, it can readily be observed that when in the preset count mode, the end of count signal 43 occurs when a stop signal from OR gate 33 is received at line 60.

Referring now to the preset time mode, when the switch 13 is in the preset time position, the incoming preset time/count signal at 47 is the output 11 of the background subtractor 7. This signal, in the initial operation, is "0", and subsequently is a pulse train of a low duty cycle, such that the input signal at 47 can be considered to be in a low "0" state. The low signal on line 47 is provided to the 8-bit clock 63, which is thus uninhibited. Incoming gated pulses from the pulse height analyzer are provided at line 45 and these data pulses are provided to input terminal 71 of OR gate 73, and as data inputs on line 75 into an 8-bit shift register 77. Likewise, the incoming gated pulses on line 45 are provided to input terminal 57 of OR gate 59 and then to input terminal 61 of AND gate 55. The pulse output of the OR gate 73 serves to clock the data input pulses of line 75 into the 8-bit shift register, and such pulses are sequentially shifted in the 8-bit storage capacity of the shift register. The shift register output 79 is provided to the OR gate 51 and to the terminal 53 of AND gate 55. When such condition is satisfied, the gated input pulses over line 45 are passed through the AND gate 55 to AND gate 58.

It is thus seen that the interposition of the 8-bit shift register 77 results in an 8-pulse delay before the gated input pulses on line 45 are able to reach the output AND gate 58. That is, the output 79 of the shift register 77 is applied to OR gate 51 and then to AND gate 55, and such output 79 is not received until after 8 data pulses from the pulse height analyzer input 45 are clocked into the shift register 77.

The 8-bits stored in the shift register are subsequently clocked out of the shift register at the end of the predetermined time period in the following manner. As stated above, when the signal on line 47 is low, i.e., in the preset time mode, the low signal is applied to input 65 of the 8-bit clock 63. The 8-bit clock 63 is inhibited only when it receives a high signal. Thus, the 8-bit clock is in an uninhibited or ready state. A start signal received on line 60, in a manner as previously described, is applied to line 61 and to the 8-bit clock; the signal over line 60 is also provided to line 67 leading into the NOR gate 66. The 8-bit clock is designed to be triggered by a low or "0" signal at 61. Thus, at the end of the predetermined time period, the signal at line 60 becomes low and the 8-bit clock, since it is in its uninhibited state, is now triggered. The triggering of the 8-bit clock 63 enables 8 pulses to be clocked out of the 8-bit clock 63 and onto line 81. These 8-pulses on line 81 pass through the OR gate 73 and the OR gate 59. Thus, the terminal 61 of AND gate 55 remains in its high state. The clocking of the 8 pulses on line 81 also serves to clock out the 8-bits that were stored in the shift register 77, through OR gate 51, into input terminal 53 of AND gate 55. Thus, the AND gate 55 passes the 8 stored pulses. Note that during this time period, there are no incoming signals from the P.H.A. gated input line 45, since the stop signal has been received at timer gate 9, as shown in FIG. 1.

At the end of the 8-bit clocking, the signal level at line 81 reverts to its low or "0" state, and is provided to the input of NOR gate 66. Since the input at line 67 is likewise low, an end of count signal is provided at 43 at the conclusion of the 8-bit clocking signal. Referring to FIG. 1, this signal is applied to AND gate 39 at input 41, thus closing gate 17. Thus, no further signals are passed to the display counter 27.

To summarize thus far, it can be seen that in the preset count mode, pulses from the pulse height analyzer 5, through the timer gate 9, are applied to the background substractor via line 45, and subsequently to an input terminal of an AND gate 58. At the end of the preset count mode, no further gated pulses from the pulse height analyzer are received and an end of count signal output is provided at terminal 43. In the present time mode, the first 8 incoming pulses are delayed by the shift register, and then forwarded to an input terminal of AND gate 58. At the end of the preset time interval, no further gated input pulses from the pulse height analyzer can be received over line 45, and the 8 pulses that remain stored in the shift register are then cleared. After the 8 pulses are cleared, an end of count signal is provided at terminal 43.

The pulses from the AND gate 55 that are coupled to an input terminal of the AND gate 58 (i.e., the pulses from the pulse height analyzer or the shift register 77, as discussed above) shall be defined herein as the "processed input pulses."

Thus far, the operation of the background subtractor has been described to show how the gated input signals from the pulse height analyzer are processed to obtain the processed input pulses that are coupled to the AND gate 58. Now, the remaining portion of the background subtractor that subtracts the background pulses from the processed input pulses will be described.

A three-decade binary coded decimal rate multiplier 83 is provided to receive a 10 kilohertz input signal from a timer over line 85. This timer may be the oscillator 19. The multiplier 83 is adapted to be interconnected with a conventional thumbwheel switch 87. The three decade BCD rate multiplier 85 comprises three parallel connected decade multipliers each of which divides the 10 kilohertz signal by 10. Thus, the 10 kilohertz signal is divided by 1,000. The thumbwheel switches 87 comprise a resistance network such that the setting of the thumbwheel switches by the operator provides a signal to the multiplier 83 proportional to the known background count rate per minute that is to be subtracted. This value is multiplied by the divided timing signal. For example, if it is known that there are 50 background pulses per minute, the operator will set the thumbwheel switches 87 to 50. The three-decade BCD rate multiplier 83 thus operates on the 10 kilohertz input signal by dividing the signal by 1,000 and then multiplying that signal by 50.

Figure 4A:
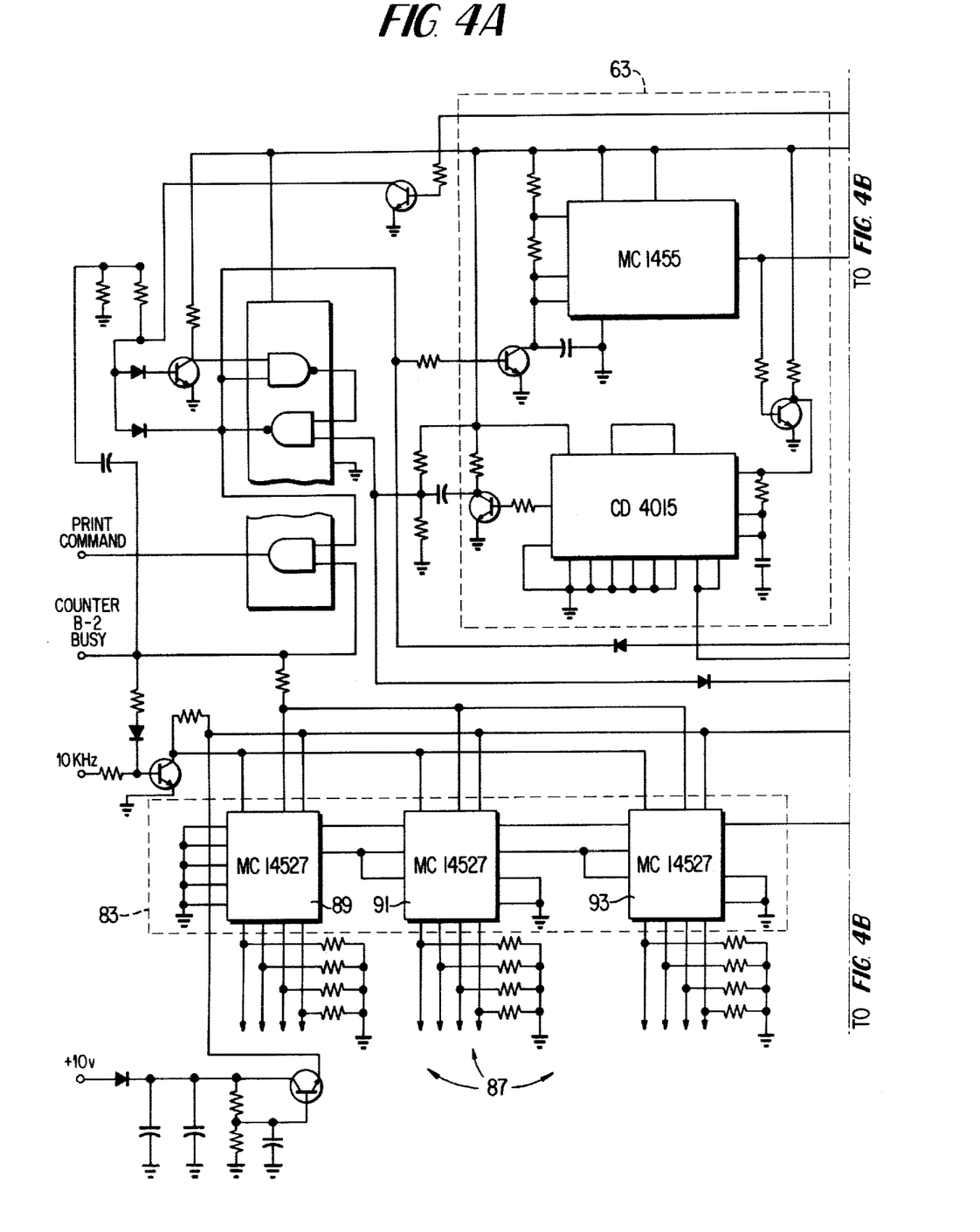
FIGS. 4A, 4B and 4C are schematic circuit diagrams of the background subtractor circuit of FIG. 2.
Figure 4B:
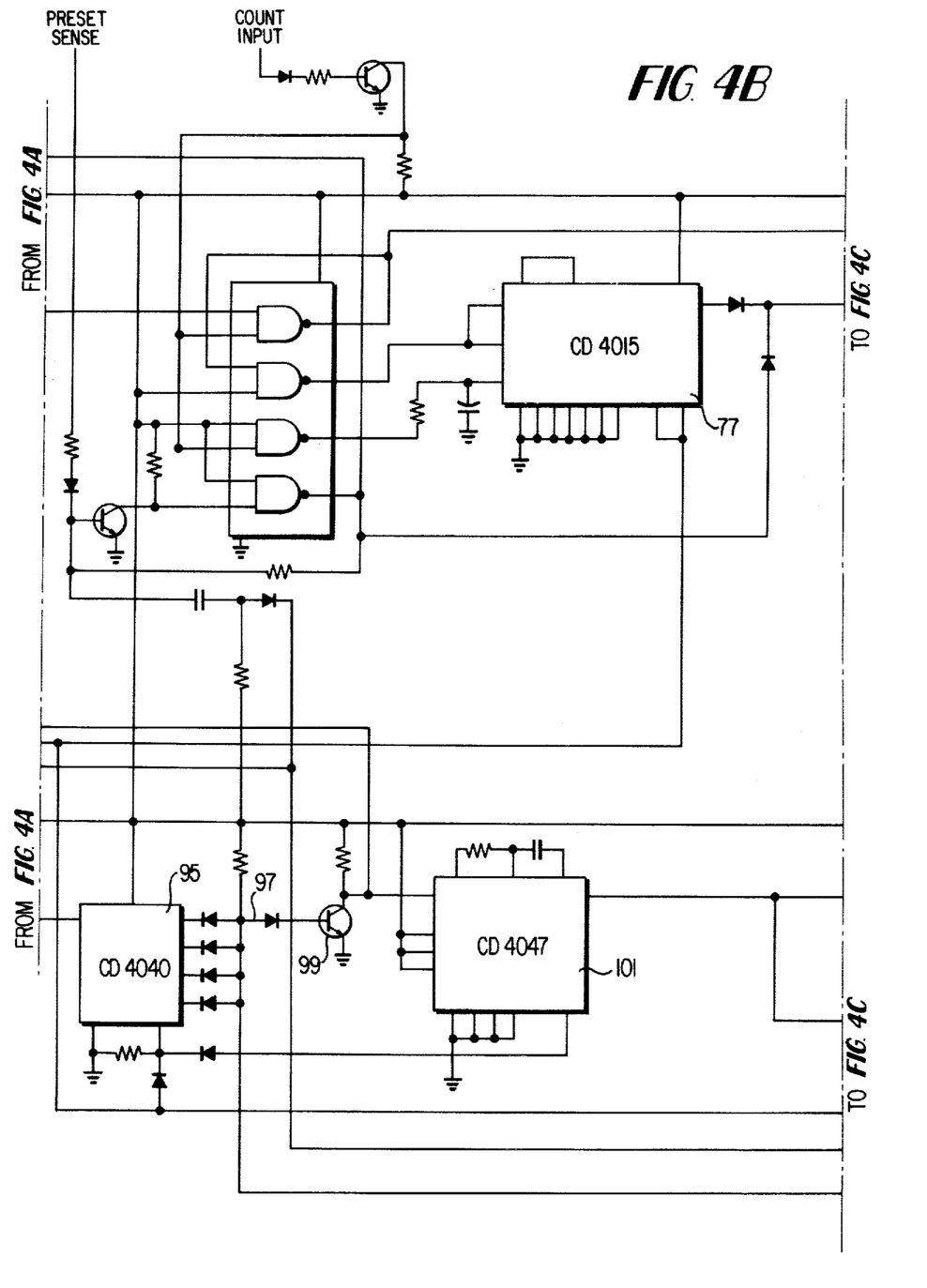
Figure 4C:
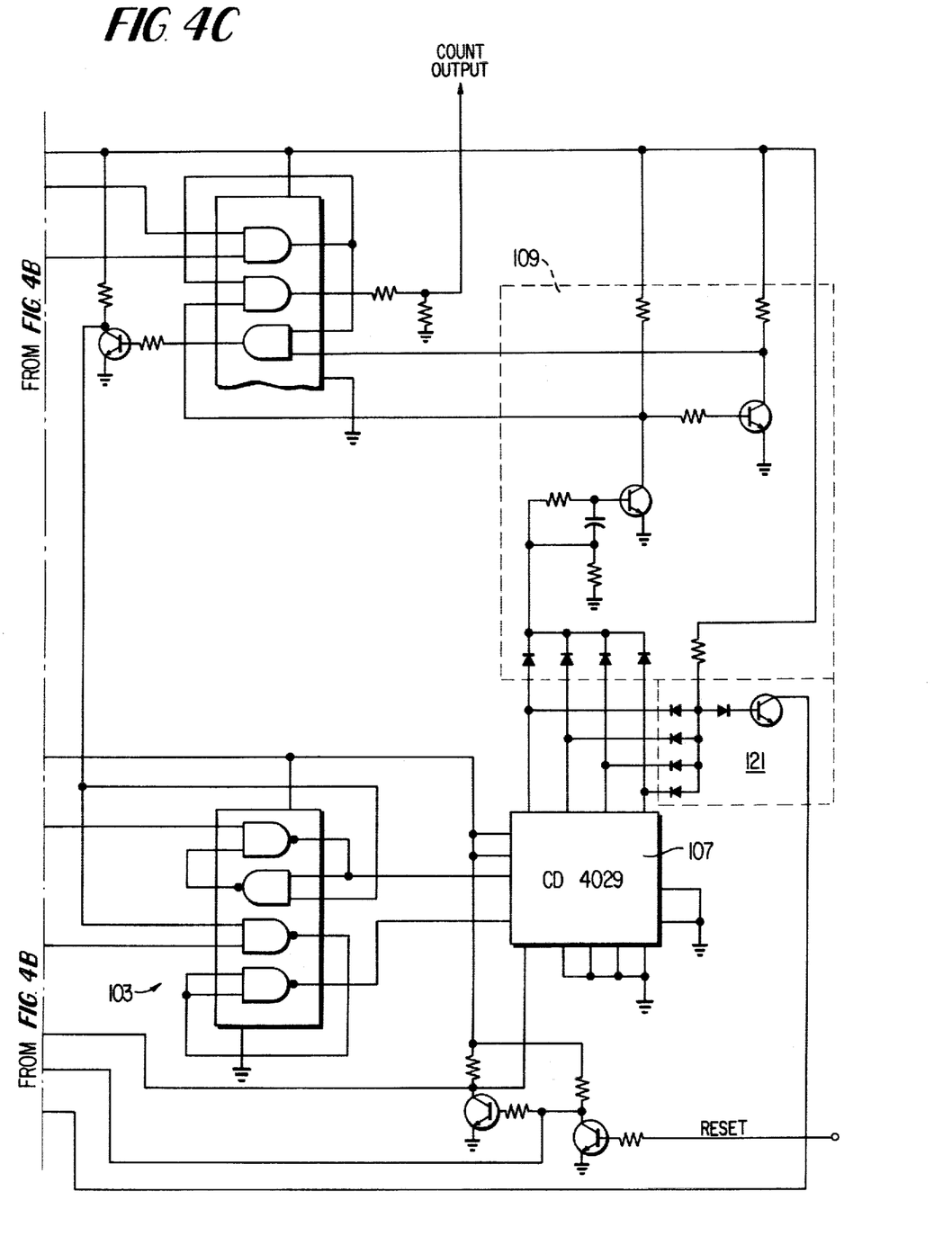

FIG. 4 is a schematic circuit diagram of the background subtractor and depicts the three-decade BCD rate multiplier 83 interconnected with the 10 kilohertz input signal from the timer over line 85, and the thumbwheel switches 87. The thumbwheel switches 87 are conventional BCD encoded thumbwheel switches. Each decade rate multiplier 89, 91, 93 is an MC14527 integrated circuit manufactured by Motorola. The thumbwheel switches 87 operate as follows:

The output signal from the three-decade rate multiplier 83 is provided to a conventional divider circuit 95, such as an RCA CD4040. The divider 95 is designed to divide the signal input by 600. The output 97 of divider 95 is thus a signal that represents the number of pulses per second that are to be subtracted. For example, let us suppose that the operator has determined that in a particular environment there are 60 pulses per minute attributed to background noise. By setting the thumbwheel switches 87 to the number 60, the three-decade BCD rate multiplier 83 operates as follows. The 10 kilohertz input signal from the timer over line 85 is divided by 1,000 which equals 10 cycles per second, or 600 cycles per minute. This is multiplied by 60 background pulses per minute, the set value of the switches 87, and results in a value of 36,000 pulses per minute. The divider 95 divides the 36,000 pulses per minute by 600, thus resulting in 60 pulses per minute, or one pulse per second. This is the rate of background pulses that are to be subtracted.

It should be known that any equivalent circuit can be used to obtain the desired pulse rate to be subtracted in pulses per second. For example, one can use a programmable divider, known in the art, which is set or programmed by the operator to obtain the number of pulses per second output that is ultimately to be subtracted from the incoming pulses from the pulse height analyzer.

The divider 95, is connected to AND gate 99. The pulses per second of background noise will then be forwarded, when passed by AND gate 99 to a one shot element 101. The one shot element 101 generates a uniform pulse which is applied to an up/down control circuit 103 at UP terminal 105, and in turn to an up/down counter 107. The output of the up/down counter 107 is applied to a zero detector 109. The zero detector 109 is capable of producing an output which is in the "1", or high state, when the up/down counter 107 output is zero. When the up/down counter 107 output is other than zero, the zero detector 109 produces an output in the "0" or low state. The zero detector 109 is connected to input 111 of AND gate 58. Thus, it is seen that when the up/down counter 107 output is zero, the zero detector 109 output is one, and the terminal 111 of AND gate 58 is one. This enables pulses from the AND gate 55 to pass through the AND gate 58 and to the output terminal 11.

When, however, the up/down counter 107 has an output, the zero detector 109 is in its low state; therefore, the pulses from AND gate 55 are prevented from passing through the AND gate 58. In this manner, the gated pulses from the pulse height analyzer, or the pulses through the shift register 77 that reach the AND gate 58, are skipped, or subtracted. It therefore can be seen that such skipped pulses are those attributed to background noise, and are not passed through to the output 11.

Further, when the output of the zero detector 109 is in its low state, i.e., when the up/down counter 107 has an output, the low output of the zero detector 109 is provided to an inverter or "not" gate 113. The output of the inverter 113 thus will become high or in its "one" state. The output of the inverter 113 is provided to AND gate 115, which in turn is provided to the up/down control circuit 103. Terminal 117 of the AND gate 115 is connected with the output of AND gate 55, which represents the pulses from the pulse height analyzer or shift register. Thus, when the output of zero detector 109 is low, reflecting an output on the up/down counter 107, the pulses through the AND gate 55 are passed through the AND gate 115 to the down control 119 of the up/down control circuit 103. From control circuit 103, the up/down counter 107 is subtracted, or allowed to count down until it reaches its zero state, i.e., until all background pulses are subtracted. When this occurs, the zero detector 109 detects zero and provides a "one" output to AND gate 58 thus permitting pulses to again pass through the AND gate 58 to the output 11.

The output of the up/down counter 107 is also provided to a "15" detector 121. In practice, the up/down counter 107 has a 4-bit binary capacity, which thus enables only 15 background pulses to be stored at any single time. If, after 15 background pulses are counted, an additional background pulse is provided before the down control 103 can subtract a pulse, the up/down counter 107 will automatically reset back to zero thus wiping out or losing the 15 background pulses that were to be subtracted. To prevent the up/down counter 107 from "overflowing" to zero, the "15" detector 121 is provided. When the up/down counter 107 reaches the number 15, the "15" detector 121 provides an output or "one" signal to an inverter or "not" gate 123. The output of inverter 123 will then become zero, thus preventing background pulses from the divider 95 to pass through the AND gate 99 to the one shot 101. When the up/down counter output is less than 15, the "15" detector 121 output is zero, thus making the output of inverter 123 a "one" or high state and enabling pulses from the divider 95 to pass through the AND gate 99 and to the one shot 101.

Figure 2:
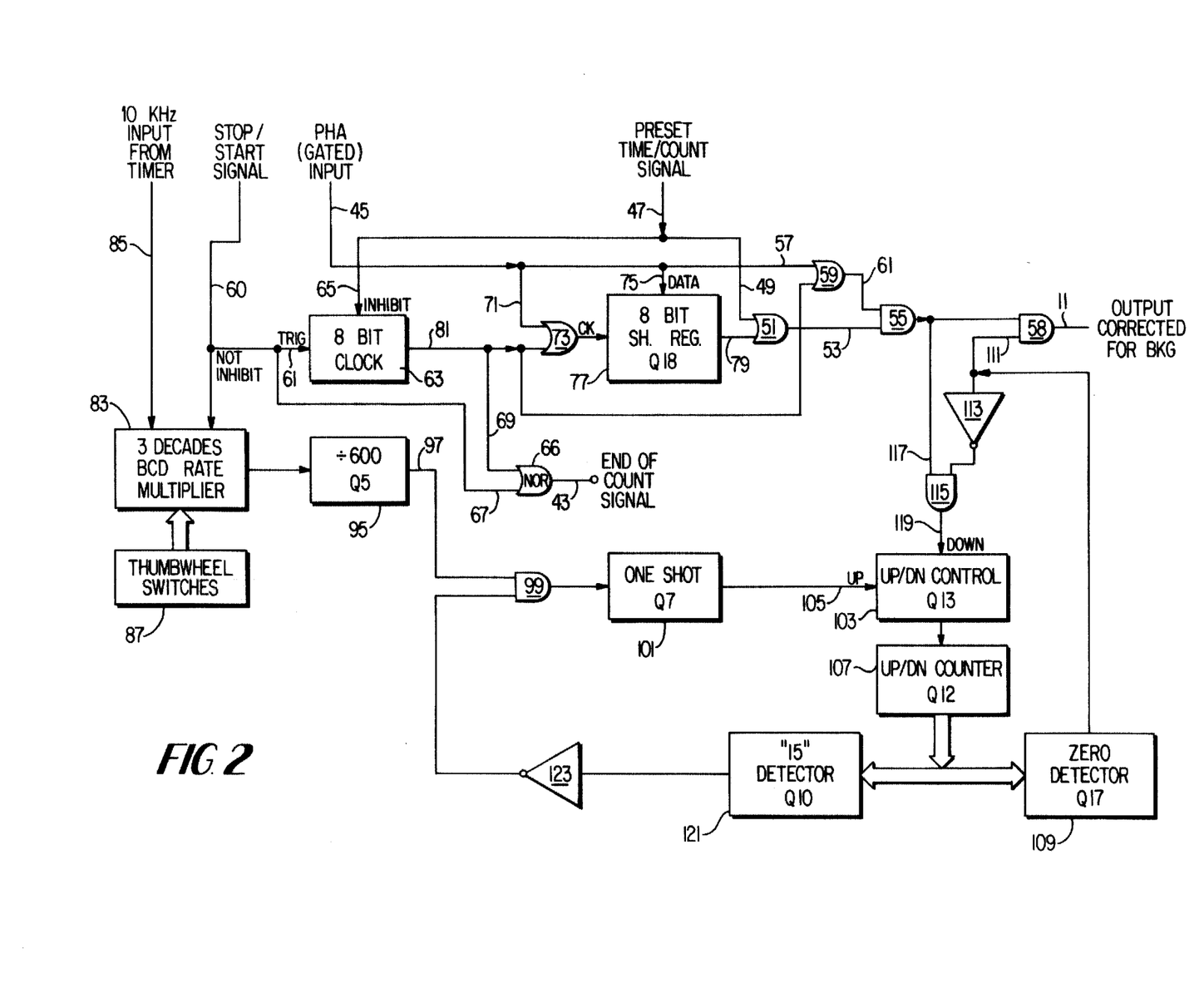
FIG. 2 is a block diagram showing one embodiment of the background subtractor circuit that is used in the FIG. 1 system.
Figure 3:
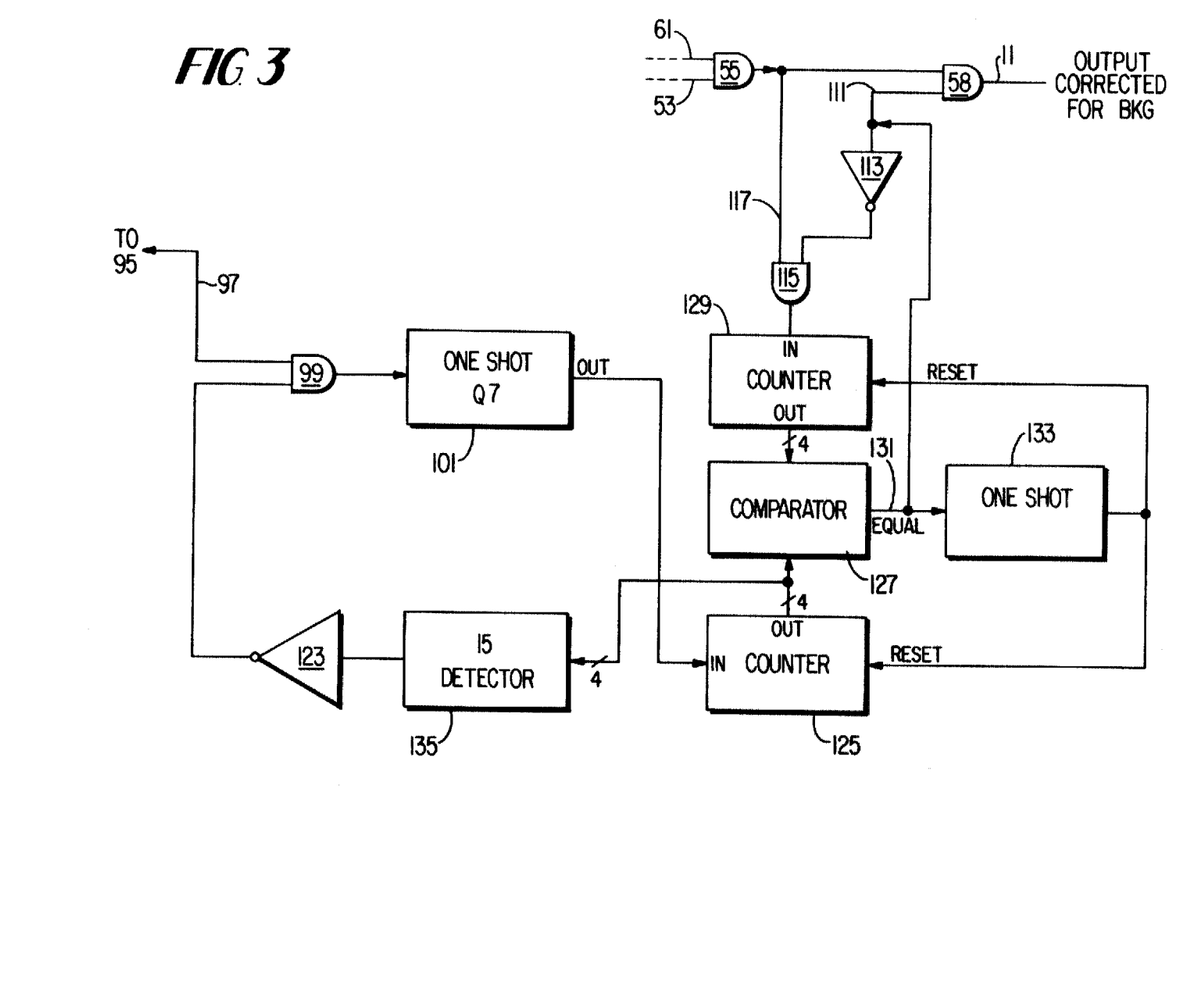
FIG. 3 is a block diagram portion of another embodiment of the background subtractor circuit.

FIG. 3 depicts a modified version of the background subtractor that uses two counters and a comparator instead of the up/down control 103 and up/down counter 107. Only a portion of the overall block diagram is depicted in FIG. 3. The remaining circuitry is shown in FIG. 2. As shown in FIG. 3, the output signal from the one shot 101 provided on line 105, represents the background pulse rate, and is applied to the input of a counter 125. The output of the counter 125 is provided to a comparator circuit 127. Similarly, the output of AND gate 115 is applied to a contour 129 which provides an output signal to the comparator 127. When the counters 125 and 129 are equal, the comparator also provides a "one" signal at line 131 which is forwarded to the inverted 113 and the AND gate 58 at terminal 111. Thus, when this condition is achieved, pulses are passed through the AND gate 58 to the output line 11. No pulses are passed through the AND gate 115 into counter 129. When, however, a background pulse is detected such that the counter 125 is advanced, the comparator output will go to its "zero" state thus blocking pulses through the AND gate 58. Likewise, pulses from AND gate 55 are provided to counter 129 which is in turn fed to the comparator 127. This provides for the subtraction or swallowing of pulses from the pulse height analyzer, or from the shift register. Note further that a one shot device 133 is provided to reset the counters when the comparator output reflects an equal or "one" condition.

A "15" detector 135 is likewise provided in the circuit of FIG. 3. The counter 125 has a storage capacity such that when full, an additional input pulse resets the counter. Thus, the pulses stored in the counter are lost. The "15" detector 135 is provided so that when the counter is full, no further pulses from the divider pass through AND gate 99, in a manner similar to that discussed with reference to FIG. 2.

FIG. 4, as discussed above, is a schematic circuit diagram of the background subtractor circuit 7 of FIG. 2. Each of the block elements depicted in FIG. 2 is illustrated in FIG. 4. The block elements shown in FIG. 4 are all conventional circuit elements with the following identification:

Element 89—MC14527 manufactured by Motorola
Element 90—MC14527 manufactured by Motorola
Element 91—MC14527 manufactured by Motorola
Element 95—CD4040 manufactured by RCA
Element 101—CD4040 manufactured by RCA
Element 103—74COO manufactured by National Semi-conductor
Element 107—CD4029 manufactured by RCA, etc.

Above, specific embodiments of the present invention have been described. It should be appreciated, however, that these embodiments were described for purposes of illustration only, without any intention of limiting the scope of the present invention. Rather, it is the intention that the present invention be limited not by the above but only as is defined in the appended claims.

I claim:

1. An electrical circuit for subtracting pulses from a pulse train comprising pulse train means for providing a series of input pulses, background subtractor means coupled with said pulse train means for subtracting pulses at a pre-selected rate from said series of input pulses to obtain output pulses, timing means for providing a series of timing pulses, gating means comprising a first gate and a second gate, switching means for selectively interconnecting said background subtractor means and timing means with said gating means, wherein said switching means can be selected to be in a first position and a second position, such that in said first position, said output pulses from said background subtractor means are provided to said first gate and said timing pulses from said timing means are provided to said second gate, and in said second position, said output pulses from said background subtractor means are provided to said second gate and said timing pulses of said timing means are provided to said first gate, comparing means connected to said first gate for comparing the number of pulses provided to said first gate with a pre-selected number, and display means connected to said second gate for displaying the number of pulses provided to said second gate.

2. The circuit of claim 1 wherein said comparing means comprises a counter connected to said first gate for counting the pulses provided to said first gate, limit setting switch means for selecting said pre-selected number, and a comparator means for comparing the pulses counted by said counter with said pre-selected number.

3. The circuit of claim 1 further comprising a timer gate, means for interconnecting said timer gate with said pulse train means and said background subtractor means for gating said series of input pulses to said background subtractor means, starting means for providing a start signal to said first gate, said second gate, and said timer gate to simultaneously open said gates.

4. The circuit of claim 3 wherein said comparing means further comprises means for providing a stop signal output when said number of pulses provided to said first gate equals said pre-selected number, and means for simultaneously providing said stop signal output to said first gate and said timer gate to close said first gate and said timer gate.

5. The circuit of claim 4 wherein said background subtractor means further comprises end of count signal generating means for providing a signal when the subtraction of pulses at a preselected rate is completed, and means for closing said second gate when said stop signal output and said end of count signal are provided.

6. The circuit of claim 5 wherein said means for closing said second gate comprises an AND gate having two inputs and an output, said two inputs adapted to receive an end of count signal from said end of count signal generating means and said stop signal respectively, and wherein said output is connected to said second gate.

7. A background subtractor circuit for subtracting a preselected number of pulses from a train of input pulses comprising, input means for receiving said train of input pulses, input signal processing means connected to said input means for providing a train of processed input pulses, the number of processed input pulses dependent upon the number of said input pulses, pre-selecting switch means for pre-selecting a number of pulses per unit of time that are to be subtracted from said train of processed input pulses, background means connected to said pre-selecting switch means for generating a background train of pulses, the number of background pulses dependent upon said number of pulses per unit of time that are to be subtracted, subtractor means interconnecting said background means with said input signal processing means for subtracting the number of background pulses from the number of processed input pulses, and an output terminal for receiving the subtracted pulse train.

8. The background subtractor circuit of claim 7 wherein said background means comprises a means for receiving an oscillating timing signal, a rate multiplier circuit means, means for providing said oscillating timing signal to said rate multiplier circuit means, means for interconnecting said rate multiplier circuit means with said pre-selecting switch means, wherein said rate multiplier circuit means divides the oscillating frequency of the oscillating timing signal by a first fixed value and multiplies the result by a the number of pulses per unit time that are to be subtracted to provide a rate multiplier output, a divider circuit means connected to said rate multiplier circuit means for dividing the rate multiplier output by a second fixed value, a one shot pulse output device connected to said divider circuit means for providing a one shot pulse at its output, said one shot pulse output comprising the train of background pulses to be subtracted.

9. The background subtractor circuit of claim 8 wherein said means for receiving an oscillating timing signal comprises means for receiving a 10 kHz signal, said rate multiplier circuit means comprises a three-decade binary coded decimal rate multiplier that divides the 10 kHz signal by 1000, said pre-selecting switch means comprises means for preselecting a number of background pulses per minute that are to be subtracted, said divider circuit means comprises means for dividing the output of said rate multiplier by 600, wherein the output of said one shot pulse output device represents the number of background pulses to be subtracted per second.

10. The background subtractor circuit of claim 7 wherein said subtractor means comprises counter means interconnected with said background means for counting up the number of background pulses in said train of background pulses, zero detector means connected to said counter means for detecting when the number of background pulses is zero or non-zero, and for providing a first signal when the zero state is detected and a second signal when a non-zero state is detected, an output gate means having two inputs, one input connected to said input signal processing means and the other input connected to said zero detector means, for receiving said train of processed input pulses from said input signal processing means and for receiving said first or second signals from said zero detector means, the output of said output gate means comprising said output terminal, wherein said train of processed input pulses from said input signal processing means are provided to said output terminal through said output gate means when said first signal is provided at the output gate means other input and wherein said train of processed input pulses are not provided to said output terminal when the second signal is provided at the output gate means other input.

11. The background subtractor of the claim 10 wherein said output gate means comprises an AND gate.

12. The background subtractor circuit of claim 10 wherein said counter means is further connected with said input signal processing means for receiving said train of processed input pulses and for counting down the background pulses in said counter means when said zero detecting means provides said second signal.

13. The background subtractor circuit of claim 12 wherein said counter means comprises a second AND gate having two inputs, one input connected to said input signal processing means, and the other input connected to the output of an inverter, the output of said second AND gate connected to an up/down control circuit means for providing the train of processed input pulses from said input signal processing means to a down counter for counting down the background pulses, said inverter having an input connected to said zero detector means.

14. The background subtractor circuit of claim 7 wherein said input signal processing means comprises a shift register means connected to said input means for receiving said input pulses, mode control signal receiving means for selectively receiving a first signal and a second signal, and gating means for directly forwarding said input pulses from said input means to said subtractor means when said first signal is received, and for forwarding said input pulses to said shift register and from said shift register to said subtractor means when said second signal is received, wherein said shift register means delays the forwarding of said input pulses to said subtractor means until the storage capacity of the shift register is exceeded.

15. The background subtractor circuit of claim 14 wherein said input signal processing means further comprises clock means connected to said shift register means for clocking out the stored input pulses in said shift register means for forwarding to said subtractor means.

16. The background subtractor of claim 15 wherein said input means receives a predetermined number of input pulses, and said input signal processing means includes end-of-count signal generating means for providing an end-of-count signal when said first signal is received and when simultaneously no further input pulses are received at said input means.

17. The background subtractor circuit of claim 15 wherein said input means receives a predetermined number of input pulses, and said input signal processing means includes end-of-count signal generating means for providing an end-of-count signal when the clock means has clocked out the shift register means and simultaneously no further input pulses are received at said input means.

18. In an improved apparatus for subtracting background noise from detected radioactive emissions including detecting means for detecting radioactive emissions and pulse train means coupled with said detecting means for providing a series of input pulses dependent upon the detected radioactive emissions, the improvement comprising background noise subtractor means coupled with said pulse train means for subtracting pulses at a predetermined rate from said series of input pulses to obtain a series of output pulses, counting means for counting the number of output pulses in a predetermined time interval, timer means for determining the time period to obtain a predetermined number of output pulses, and coupling means for selectively coupling said background subtractor means with one of said counting means and timer means.

19. The apparatus of claim 18 further comprising indicating means for indicating information, said indicating means coupled with said counting means and timer means to indicate either the number of output pulses in a predetermined time interval or the time period to obtain a predetermined number of output pulses, depending upon the selective coupling of said coupling means.

* * * * *